United States Patent
Peckham

(10) Patent No.: US 7,133,877 B2
(45) Date of Patent: Nov. 7, 2006

(54) METHOD AND APPARATUS FOR MANAGING A SET OF DATA STRUCTURES ASSOCIATED WITH A LARGE FILE

(75) Inventor: Stephen Bailey Peckham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 10/264,167

(22) Filed: Oct. 3, 2002

(65) Prior Publication Data

US 2004/0068503 A1  Apr. 8, 2004

(51) Int. Cl.
G06F 17/30 (2006.01)
(52) U.S. Cl. ...................................... 707/102
(58) Field of Classification Search ............ 707/1–10, 707/200, 205, 100–1
See application file for complete search history.

(56) References Cited

U.S. PATENT DOCUMENTS 4,792,937 A * 12/1988 Picard ..................... 369/59.25
5,590,329 A * 12/1996 Goodnow et al. ........... 717/144
6,725,244 B1 * 4/2004 Bonwick ..................... 707/205
6,854,035 B1 * 2/2005 Dunham et al. ............ 711/117

* cited by examiner

Primary Examiner—Don Wong
Assistant Examiner—Marc R. Filipczyk
(74) Attorney, Agent, or Firm—Duke W. Yee; Thomas E. Tyson; Lisa L. B. Yociss

(57) ABSTRACT

A method and apparatus for managing data structures associated with large files are provided. With the apparatus and method, region control blocks for a data file are allocated on demand from an array of control blocks and are organized into a tree data structure. The tree data structure includes a base region control block and zero or more extended region control blocks. The base region control block includes a pointer to a root of the tree data structure and information about the data file. The extended region control blocks have pointers to the base region control block, to a successor region control block, and pointers to zero to four child region control blocks. Using this tree data structure, the operating system may perform various operations on the region control blocks with improved performance.

21 Claims, 6 Drawing Sheets

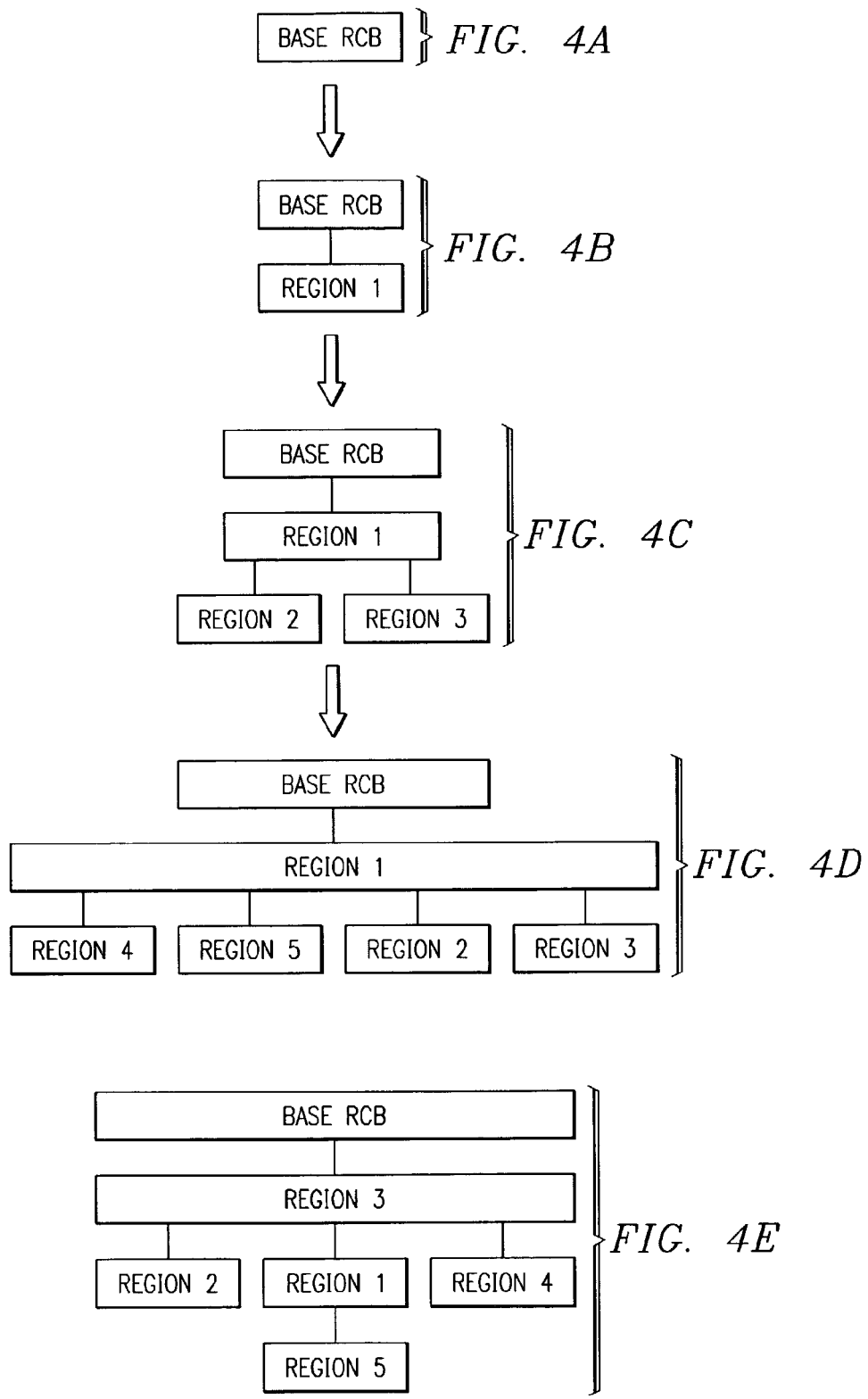

METHOD AND APPARATUS FOR MANAGING A SET OF DATA STRUCTURES ASSOCIATED WITH A LARGE FILE

BACKGROUND OF THE INVENTION

1. Technical Field

The present invention is directed to a method and apparatus for managing a set of data structures associated with a large file. More specifically, the present invention is directed to a method and apparatus for maintaining and using a tree structure to represent the relationship of region control blocks of a data file.

2. Description of Related Art

In the AIX operating system, it is useful to divide files into regions of 256 megabytes. Each region is assigned a unique identifier that is used by the virtual memory manager to find the memory associated with each region. The unique identifier can be mathematically converted to an address of a region control block, which is used to maintain information about the region, such as how many pages of the region are currently in memory, and the like.

In AIX version 5.2, files as large as 16 terabytes are supported. A 16-terabyte file contains 65,536 256-megabyte regions. The AIX operating system is designed to support 4 petabyte files ($2^{52}$ bytes), and a file this large contains 16,777,216 regions.

In the AIX operating system, a file that is currently in use by an application is uniquely identified by the identifier assigned to the file's first 256-megabyte region. This region is called the "primary region" or "base region." If the file is larger than 256 megabytes, additional region control blocks are allocated, each with its own unique identifier. These regions are called "extended regions." The regions are numbered consecutively with region 0 being the base region while region 1 is the extended region associated with the second 256-megabyte region of the file (the unique identifier associated with a region is independent of the region number).

Files can be created without writing to every region of the file. In addition, an application can read a portion of a file without reading the entire file. In both cases, the operating system allocates new region control blocks dynamically.

Typically, the control blocks for a file are part of a linked list in which each control block for a region has a pointer to the control block for another region. Thus, operations performed on the regions of the files require traversing the linked list until the desired region control block is encountered and then performing the operation. Since large file in AIX may have 16,777,216 regions, the linked list becomes large and the computing time required to traverse such a linked list becomes prohibitive.

Thus, it would be beneficial to have a method and apparatus for managing a set of data structures associated with a large file that arranges the control blocks in a tree, so that a desired region control block can be found much more quickly, thereby reducing the amount of computing time necessary to identify the control blocks for regions of interest.

SUMMARY OF THE INVENTION

The present invention provides a method and apparatus for managing data structures associated with large files. With the present invention, region control blocks for a data file are allocated on demand from an array of region control blocks and are organized into a tree data structure. The tree data structure includes a base region control block and zero or more extended region control blocks. The base region control block contains information about the data file and also includes a pointer to an extended region control block, which is the root of the tree data structure. The extended region control blocks have pointers to the base region control block and pointers to zero to four child region control blocks.

Using this tree data structure, the operating system may perform various operations on the region control blocks. With the present invention, a "create" operation is used to create the base region control block for a data file. An "insert" operation is used to add extended region control blocks for specific regions of the data file and to associate the extended region control blocks with the base region control block. A "lookup" operation is used to find an associated extended region control block given a base region control block and a region number. A "findbase" operation is used to find the base region control block given an extended region control block. The "successor" operation is used to find an extended region control block that is associated with the next region of a data file given an extended region control block. The "delete" operation is used to delete a base region control block and all of its associated extended region control blocks. These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 4A–4E are diagrams illustrating the creation of a tree data structure using the mechanisms of the present invention;

DETAILED DESCRIPTION OF THE PREFERRED EMBODIMENT

Figure 1:
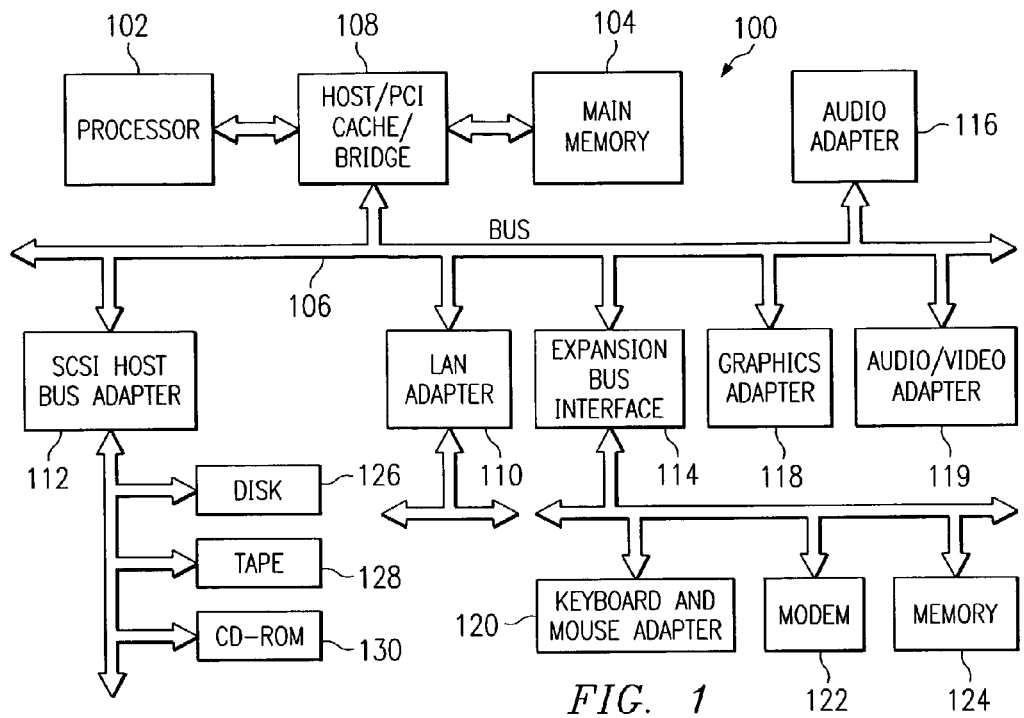
FIG. 1 is an exemplary block diagram of a computing device in accordance with the present invention.

With reference now to FIG. 1, a block diagram of a data processing system is shown in which the present invention may be implemented. Data processing system 100 is an example of a computer in which code or instructions implementing the processes of the present invention may be located. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards.

In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. An object oriented programming system such as Java may run in conjunction with the operating system and provides calls to the operating system from Java programs or applications executing on data processing system 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a personal digital assistant (PDA), which is configured with ROM and/or flash ROM to provide non-volatile memory for storing operating system files and/or user-generated data.

The depicted example in FIG. 1 is not meant to imply architectural limitations. For example, data processing system 100 also may be a notebook computer or hand held computer in addition to taking the form of a PDA. Data processing system 100 also may be a kiosk or a Web appliance.

The processes of the present invention are performed by processor 102 using computer implemented instructions, which may be located in a memory such as, for example, main memory 104, memory 124, or in one or more peripheral devices 126–130.

Figure 2:
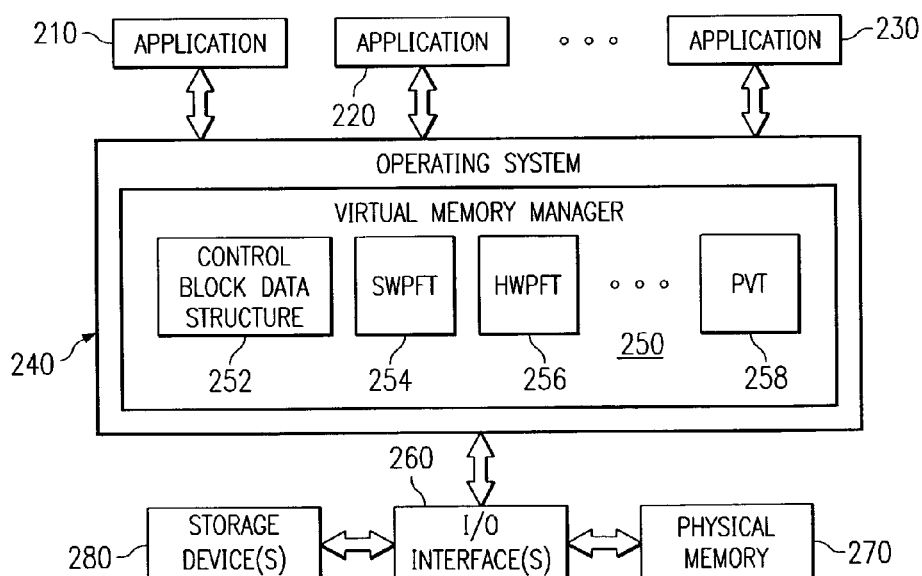
FIG. 2 is an exemplary block diagram illustrating a virtual memory manager in accordance with the present invention.

FIG. 2 is an exemplary block diagram illustrating a virtual memory manager in accordance with the present invention. As shown in FIG. 2, the applications 210–230 perform operations on data files by sending instructions to the operating system 240 to perform such data file operations. In a system in which virtual memory is utilized, a virtual memory manager 250 is provided in the operating system 240 for managing the virtual memory and translating between virtual addresses used by the applications 210–230 and physical addresses of the physical memory 270.

The virtual memory manager 250 maintains a number of data structures for managing the virtual memory. These data structures include an array of region control block data structures 252, a software page frame table (SWPFT) 254, a hardware page frame table (HWPFT) 256, a physical-to-virtual address table (PVT) 258, and the like. The HWPFT 256 is used by the system hardware to perform data access operations on data stored in physical memory. The HWPFT 256 maps virtual addresses to physical address of those pages of memory that are going to be regularly accessed by the system hardware, e.g., the processor.

In the event that the HWPFT 256 does not include an entry for a portion of data of interest, the SWPFT 254 is used to identify the portion of physical memory 270 that contains the data, if the data is in the physical memory 270. If the data is not in physical memory, the region control blocks are used to determine how to reload data into physical memory 270 from the storage device(s) 280. The physical-to-virtual table 258 provides a data structure for mapping physical address back to virtual addresses.

The control block data structures 252 store information for regions of physical memory managed by the virtual memory manager 250 of the operating system 240. The control blocks store information about data files, such as counts of pages currently stored in physical memory, state flags, lock information, and the like. Control blocks are created dynamically as regions of a data file are read from or written to by an application. (Some of the control blocks may contain information about the physical memory that is not used for reading and writing data files.)

In accordance with the present invention, the region control blocks 252 further include information for maintaining a tree data structure representing the regions of the data file. The tree data structure of region control blocks includes a root, a base region control block that points to the root, and one or more extended region control blocks that point to the child extended region control blocks and to the base region control block.

For base region control blocks, i.e., the region control block that uniquely identifies the file, the control block includes a pointer to the root of the tree data structure, where the root is a first extended region control block. For extended region control blocks, i.e., additional 256-megabyte region control blocks in addition to the base region control block, the control blocks include a pointer to the base region control block (RCB) and pointers to a predetermined number of child region control blocks.

In a preferred embodiment, the extended RCBs may have up to four pointers to child RCBs. However, the present invention is not limited to four child RCBs and can make use of any number of child RCBs. It is preferable, however, that the number of child RCBs be a power of 2 for ease in computing which child pointer should be used to find the desired control block.

The organization of base region control block and extended region control blocks in accordance with the present invention generates a region control block tree structure that may be easily searched for a desired region control block. The tree structure of the present invention is preferable over the linked list approach taken in prior art systems since it minimizes that amount of computing time necessary to find a region control block of interest.

That is, in the prior art systems, either a singly-linked list or a doubly-link list is used to link the region control blocks of a file. In a singly-linked list, each element points to the next element. To find a specific element, one starts at the beginning of the list and follows the "next" pointer until the desired element is found. In the worst case, one might have to search through every element on the list, if the desired element is last or not on the list at all. In a doubly-linked list, each element has pointers to both the next and previous elements. To find a desired element, the same search must be performed. The advantage of a double-linked list is that elements can be removed from the list without searching from the beginning of the list.

In the tree structure of the present invention, each element can point to a number of other elements (four in the present exemplary embodiment). To find a desired node in the tree structure, one starts at the root, uses a rule to pick one of the children, uses the same rule to pick one of the children's children, and so on, until the desired element is found. In this case, the effort that must be expended to find a node (or discover that it is not there) is proportional to the depth of the tree. If the tree is balanced (that is, each node has about the same number of children), then the depth of the tree is proportional to the logarithm of the number of elements in the tree.

When searching a linked list, one must search half of the elements (on average) to find a node. With a tree, one must search as many elements as ½ of the average depth of the tree.

Figure 3A:
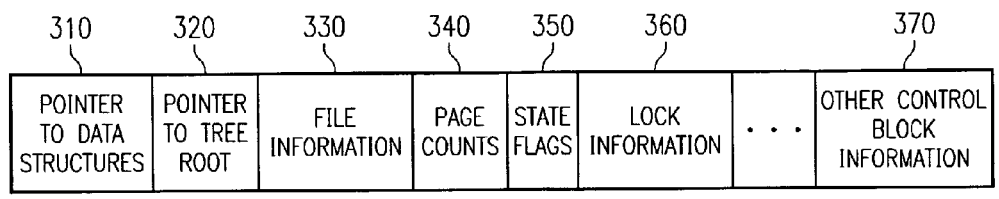
FIGS. 3A and 3B are exemplary diagrams of control blocks in accordance with the present invention.

FIG. 3A is an exemplary diagram of a base region control block in accordance with the present invention. As shown in FIG. 3A, the base region control block includes pointers 310 to entries in data structures used for maintaining the virtual memory, a pointer 320 to the root of the tree data structure for the data file, file information 330 describing the data file for which this base region control block is the first region control, page counts 340, state flags 350, lock information 360 and other control block information 370.

Figure 3B:
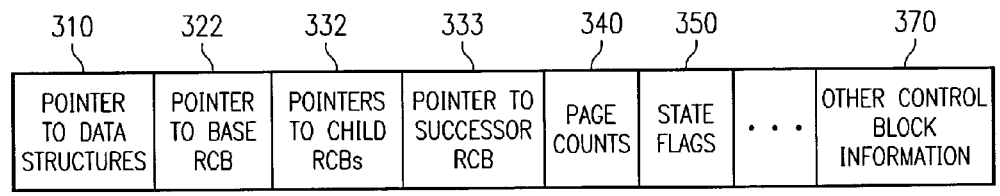

FIG. 3B is an exemplary diagram of an extended region control block in accordance with the present invention. The extended region control block contains similar fields to that of the base region control block. Specifically, the extended region control block includes the pointers to data structures 310, page counts 340, state flags 350 and other control block information 370. The main difference between the base region control block and the extended region control block is that, instead of the pointer to the root of the tree data structure 320 and the file information 330, the extended region control block includes a pointer to the base region control block 322, a pointer to a successor region control block 333, and pointers to child region control blocks 332.

The region control blocks are created on demand as applications read and write different regions of a file. As the region control blocks are created, the pointers to the root, base region control blocks and child extended control blocks are populated in the region control blocks. In this way, the tree data structure is generated through the setting of pointers in the region control blocks in the virtual memory manager.

In a preferred embodiment of the present invention, the tree data structure is a 4-ary tree. That is, each region control block (RCB), other than the base RCB, is a node in the tree. Each node has zero to four children. The base RCB points to the root of the tree. The nodes in the tree are arranged so that the region number can be used to descend into the tree to find the desired RCB.

FIGS. 4A–4D are diagrams illustrating the creation of a tree data structure using the mechanisms of the present invention, if the first six regions are inserted in order. As shown in FIG. 4A, the first region control block added to the tree is the base RCB. Since there are not extended region control blocks at this time, the pointer to the root of the tree is NULL. As illustrated in FIG. 4B, the second RCB, an extended RCB, is added as the root of the RCB tree. It points back to the base RCB, but its child pointers and successor pointer are NULL.

Thereafter, the third and fourth region control blocks for regions 2 and 3 are added based on their region numbers. In the example depicted in FIG. 4C, the third and fourth region control blocks are added as children 2 and 3 of the extended region control block for region 1.

Similar to regions 2 and 3, regions 4 and 5 are added to the tree data structure based on their region numbers. In the example shown in FIG. 4D, extended region control blocks for regions 4 and 5 are added as children 0 and 1 of the region control block for region 1.

Thus, the placement of RCBs in the tree structure, in a preferred embodiment, is based on the region number. In the depicted example, since region 1 is added as the first extended RCB, it becomes the root of the tree structure. When region 2 is to be added, the region number is written in base 4, or 0002. Since the rightmost digit is 2, and since there is no existing child 2 of region 1, the new RCB (for region 2) is added as child 2. Similarly, Region 3 is added as child 3. When region 4 is to be inserted, its base-4 representation is examined: 4 is 0010 in base 4. Since the rightmost digit is 0, region 4 is added as child 0 of region 1. Similarly, 5 is 0011 in base 4, so region 5 is added as child 1 of region 1, since the rightmost digit is 1. In this example, regions 2–5 could be added in any order, and the tree structure shown in FIG. 4D would result.

Suppose the regions were added in the order 3,1,5,2,4, as illustrated in FIG. 4E. Region 3 would be the root of the tree structure and region 1 would be child 1 of region 3. When region 5 is added (5 is 0011 in base 4) but the root (region 3) already has a child 1. Therefore, region 5 would be added as child 1 of region 1, since 1 is the $2^{nd}$ rightmost digit of region 5's base-4 representation. Regions 2 and 4 would be added as child 0 and 2 of region 3. At this point, there would be no child 3 of region 3.

The AIX operating system performs various abstract operations on region identifiers and region control blocks for creating and using the tree RCB data structure described previously. These operations include CREATE, INSERT, LOOKUP, FINDBASE, SUCCESSOR, and DELETE. The CREATE operation allocates the base region control block (RCB) for a file. The INSERT operation allocates an extended RCB for a specific region of a file and associates the extended region control block with the base RCB (if the desired extended RCB already exits, the operation fails). The LOOKUP operation finds an associated extended RCB, if it has been allocated, given a base RCB and a region number. The FINDBASE operation finds the base of an RCB associated with a given extended RCB. The SUCCESSOR operation, given an extended RCB, finds the extended RCB whose region number is one more than the region number of the given RCB, if it exists. The DELETE operation deletes the base RCB and all of its associated extended RCBs.

When a data file is opened by an application, the CREATE operation is used to create a base RCB for the first region of the data file. The CREATE operation involves allocating a region control block and initializing its fields, as illustrated in FIG. 3A.

Figure 5:
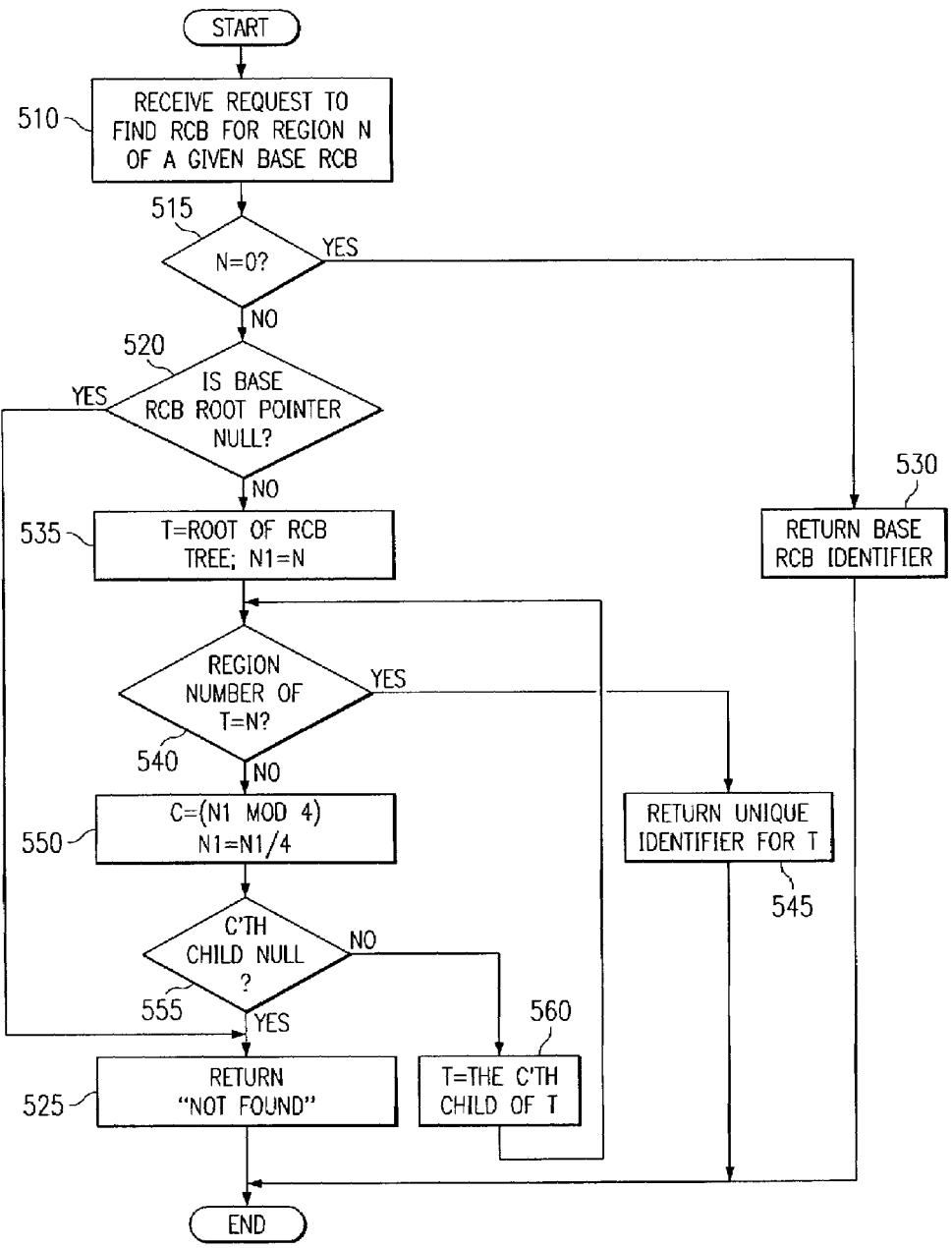
FIG. 5 is a flowchart outlining an exemplary operation of the present invention when performing a lookup of a region control block in the tree data structure of the present invention.

FIG. 5 is a flowchart outlining an exemplary operation of the present invention for performing a LOOKUP of a RCB in a tree data structure. As shown in FIG. 5, the operation starts with receiving a request to find the RCB for region n in the tree data structure (step 510) associated with a base RCB. The request for locating the region control block may be, for example, in response to a request to read data stored in a location associated with the region control block.

In response to receiving the request, the operation makes a determination as to whether n is 0 (step 515), i.e. whether the node of interest is the base RCB. If so, then the base RCB identifier is returned as a result of the lookup (step 530). If n is not 0, a determination is made as to whether the base RCB root pointer is null (step 520). If so, a value of "not found" is returned (step 525). If the base RCB root pointer is not null, t is set equal to the root of the RCB tree data structure and n1 is set equal to the value of n (step 535). A determination is made as to whether the region number of t equals n (step 540). If so, the RCB identifier for t is returned as a result of the lookup operation (step 545). If the region number of t is not equal to n, c is set equal to n1 mod 4 and n1 is set equal to n1/4 (step 550).

A determination is made as to whether the c'th child node is null (step 555). If not, t is set equal to the c'th child of t (step 560) and the operation returns to step 540. If the c'th child is null, a value of "not found" is returned (step 525).

The computation performed in step 550 may be understood by writing the region number in base 4 and considering the base 4 digits in right-to-left order. The computation of "n1 mod 4" is equivalent to selecting the rightmost digit of n1. The computation "n1/4" is equivalent to removing the rightmost digit of n1. For example, a region number 100 is 1210(base 4). The algorithm of the present invention will search the root of the RCB tree. If the root RCB is not for region 100, the $0^{th}$ child c1 will be examined. If RCB c1 is not the desired RCB, the 1st child of c1 will be examined, followed by the $2^{nd}$ child of the first child of c1, followed by the $1^{st}$ child of this RCB.

Figure 6:
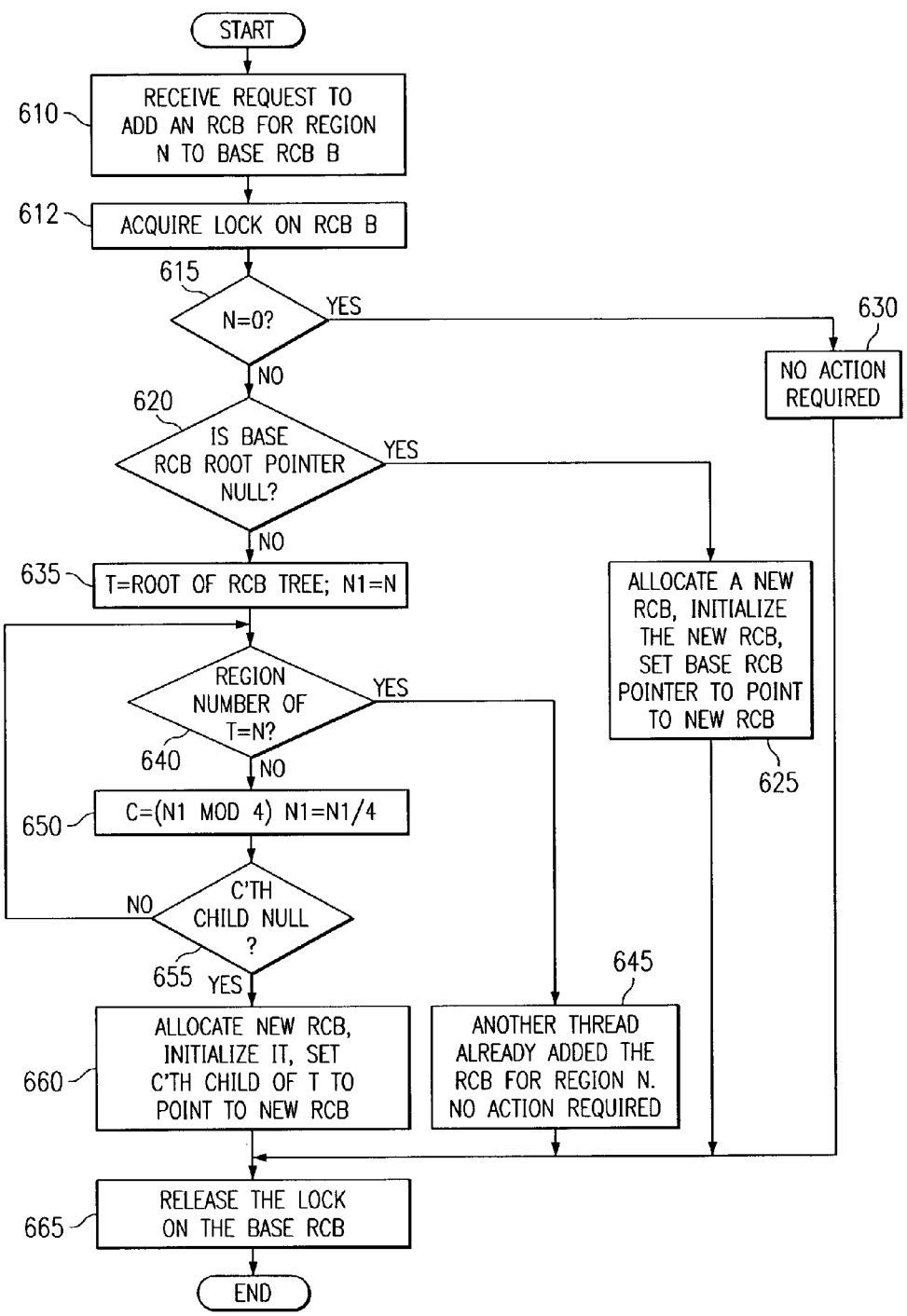
FIG. 6 is a flowchart outlining an exemplary operation of the present invention when adding new region control blocks to a tree data structure.

FIG. 6 is a flowchart outlining an exemplary operation of the present invention for adding nodes to the tree data structure. As shown in FIG. 6, the operation starts with receiving a request to add an RCB for region n (step 610) to the tree associated with a base RCB b. This may be in response, for example, to more than a 256-megabyte data file being written to memory and thus, an extended region control block must be created. A lock is acquired on RCB b (step 612) and a determination is made as to whether n is zero (step 615). If so, no action is required (step 630). The lock is released on the base RCB (step 665) and the operation ends.

If n is not zero, a determination is made as to whether the base RCB root pointer is null (step 620). If so, a new RCB is allocated, initialized, and a pointer in the base RCB is set to point to the new RCB (step 625). If the base RCB root pointer is not null, t is set to the root of the RCB tree and n1 is set to n (step 635). A determination is then made as to whether the region number for t is equal to n (step 640). If so, another thread has already added the RCB for region n and no further action is required (step 645). The lock is released (step 665) and the operation ends.

If the region number of t is not equal to n, c is set equal to (n1 mod 4) and n1=n1/4 (step 650). A determination is then made as to whether the c'th child is null (step 655). If not, t is set equal to the c'th child of t (step 660), and the operation returns to step 640. If the c'th child is null, a new RCB is allocated, initialized, and the c'th child of t is set to point to the new RCB (step 662). The lock is then released on the base RCB (step 665) and the operation ends.

New nodes are always added at leaves of the RCB tree data structure and are added at the last node encountered when searching for the desired node. Because new nodes are always added at a leaf, multiple searches can be undertaken simultaneously. When a new node must be added, a lock is taken on the base RCB to ensure that only one execution thread adds the new node. If a second thread tries to add a node for the same region number at the same time, the second thread will not be able to acquire the lock until the first thread release the lock. At this time, the second thread will acquire the lock and search for the desired RCB. Because the first thread will have already added the RCB for the specified region, the second thread will simply return without changing the tree.

It is also possible to use atomic pointer operations to add a new node to the tree. Atomic operations are operations that execute as a single instruction, but will not perform the operation if another thread was updating the same field at the same time. Using an atomic operation, a first thread may add the node for a region number to the tree data structure and another thread that attempts to add a node for the same region number will see the region as already being present in the tree data structure. As a result, the second thread will not add the node. In this case, no explicit lock is acquired.

The FINDBASE operation returns the identifier for the base RCB given any RCB in the file. If the given RCB is the base RCB, its identifier is returned. Otherwise, each extended RCB points to the base RCB, so this pointer can be used to find the base RCB and return its identifier.

In many cases, the RCBs are referenced sequentially. The SUCCESSOR operation, given an RCB for region n, returns the identifier for the RCB for region n+1, if it exists. To improve performance, however, each extended RCB includes a pointer that may point to the successor RCB. The successor region is the region with the next region number. The RCBs can be added to the tree structure in any order, so the organization of the tree structure is independent of the order of the RCBs based on region number.

The successor RCB field is null if the successor region does not exist. Otherwise, the field is filled in as a side effect of a successful prior use of the successor operation, as discussed hereafter. If the field is filled in, its value can be used on future calls to the SUCCESSOR function.

Figure 7:
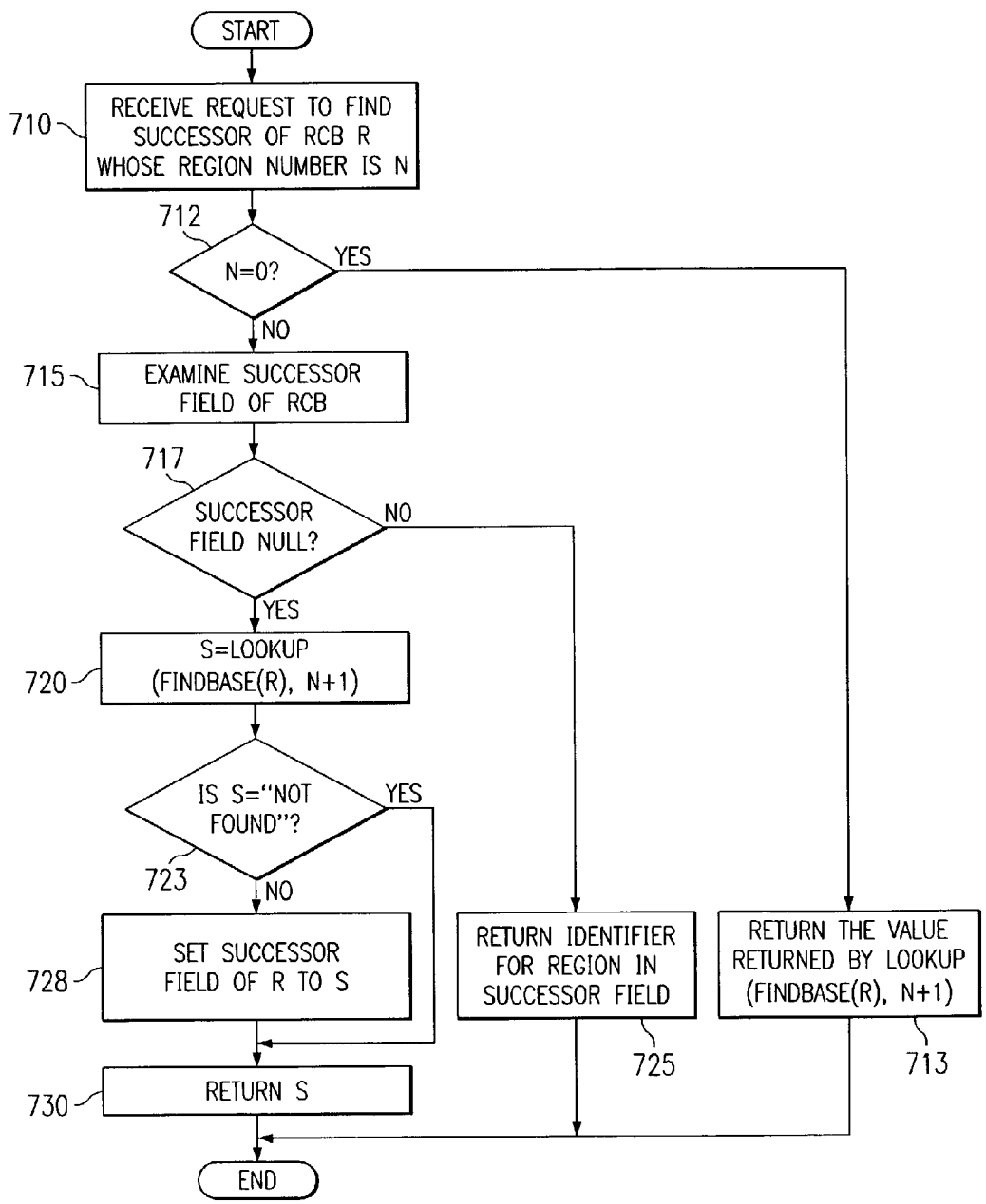
FIG. 7 is a flowchart outlining an exemplary operation of the present invention when determining a successor region control block to a given region control block using the tree data structure of the present invention.

FIG. 7 is a flowchart outlining an exemplary operation of the present invention when determining a successor region control block to a given region control block using the tree data structure of the present invention. As shown in FIG. 7, the operation starts with receiving a request to find the successor RCB of an RCB r whose region number is n (step 710). If n is 0 (step 712), the given RCB is the base RCB, which has no successor field. In this case, the LOOKUP operation is used to find the RCB for region 1, if it exists (step 713).

Otherwise, the successor field of the given RCB is examined (step 715). If the successor field of RCB r is not null (step 717), it points to the RCB for region n+1, and the identifier for this region is returned (step 725). If the successor field is null, s is set equal to the value returned by LOOKUP(FINDBASE(r), n+1) (Step 720). If s is "not found" (step 723), the successor RCB does not exist, and NULL is returned. Otherwise, then the successor field of r is set to s (step 728) and s is returned (step 730).

The DELETE operation involves performing a FINDBASE operation and then deleting the base RCB and any associated extended RCBs. This is done by recursively deleting all of the children of a node and then deleting the node itself. Note that there is no requirement to delete the extended RCB for a single region. Once an extended RCB is created, it remains associated with the data file, even if none of the region exists in real memory.

For performance reasons, multiple execution threads are able to perform the LOOKUP, FIELDBASE and SUCCESSOR operations simultaneously. The insert operation is serialized with other execution threads so that a given region of a data file is associated with at most one RCB. When the above mechanisms are used to manage the RCBs of a data file, the resulting 4-ary tree data structure has the following properties. First, the depth of the tree data structure is limited to the logarithm (base 4) of the maximum region number. For a 4 petabyte file, the maximum region number is $16,777,216=4^{12}$. Thus, the maximum tree data structure depth is 12. As a result, searches of the tree data structure require much less computing time than linked lists in which every one of the 16,777,216 regions must be searched.

Second, if regions are added in numerical order, the tree remains balanced. For such a tree, the depth of the tree is the logarithm (base 4) of number of RCBs in the tree. This means that the tree for a small file will not be very deep.

In the worst case, the depth of the tree can be equal to the number or RCBs in the tree, if all the RCBs in the tree have region numbers with similar base 4 representations. Even so, the depth cannot exceed the maximum depth, which is based on the maximum allowable region number. For example, if RCBs with the following regions numbers are added: $2_{(base\ 4)}$, $22_{(base\ 4)}$, $222_{(base\ 4)}$, $2222_{(base\ 4)}$, $22222_{(base\ 4)}$, $222222_{(base\ 4)}$, $2222222_{(base\ 4)}$, etc., then each node will have a single child. Even in the worst case, the depth of the tree structure is limited. That is, even if 12 extended RCBs are added to make a tree structure of depth 12, the depth will stay at 12, no matter how many additional RCBs added.

Thus, the present invention provides a mechanism for managing region control blocks for a data file that stores the region control blocks in a tree data structure. The tree data structure of the present invention provides for efficient and less computational time for searching for and managing region control blocks.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of managing region control blocks of a data file, comprising:
    generating a base region control block for a base region of the data file;
    generating one or more extended region control block nodes arranged in a tree data structure for one or more extended regions of the data file, a first one of the one or more extended region control block nodes being a root of the tree data structure,
    including, in the one or more extended region control block nodes, one or more child node pointers that point to child extended region control block nodes and a pointer to the base region control block;
    including, in the base region control block, a pointer that points to the root, wherein the base region control block is not the root of the tree; and
    managing the base region control block and one or more extended region control blocks based on the tree data structure.

2. The method of claim 1, wherein the base region control block contains information for uniquely identifying the data file.

3. The method of claim 1, wherein the one or more extended region control blocks include a successor pointer that points to a next region extended region control block.

4. The method of claim 1, wherein generating one or more extended region control block nodes includes adding extended region control block nodes to the tree data structure based on an order of the one or more extended region control blocks.

5. The method of claim 4, wherein the order of the one or more extended region control blocks is a numerical order based on region number.

6. The method of claim 1, wherein the tree data structure is a 4-ary tree data structure.

7. The method of claim 1, wherein managing the base region control block and one or more extended region control blocks includes providing a lookup function for looking up a specific region control block in the tree data structure.

8. The method of claim 1, wherein managing the base region control block and one or more extended region control blocks includes providing an insert function for inserting a new extended region control block node in the tree data structure.

9. The method of claim 8, wherein the insert function is an atomic operation.

10. The method of claim 1, wherein managing the base region control block and one or more extended region control blocks includes providing a successor function for identifying an extended region control block that immediately succeeds a given extended region control block.

11. A computer program product in a computer readable medium for managing region control blocks of a data file, comprising:
    first instructions for generating a base region control block for a base region of the data file;

second instructions for generating one or more extended region control block nodes arranged in a tree data structure for one or more extended regions of the data file, a first one of the one or more extended region control block nodes being a root of the tree data structure, the one or more extended region control block nodes including one or more child node pointers that point to child extended region control block nodes and including a pointer to the base region control block;

the base region control block including a pointer that points to the root, wherein the base region control block is not the root of the tree; and third instructions for managing the base region control block and one or more extended region control blocks based on the tree data structure.

12. The computer program product of claim 11, wherein the base region control block contains information for uniquely identifying the data file.

13. The computer program product of claim 11, wherein the one or more extended region control blocks include a successor pointer that points to a next region extended region control block.

14. The computer program product of claim 11, wherein the second instructions for generating one or more extended region control block nodes include instructions for adding extended region control block nodes to the tree data structure based on an order of the one or more extended region control blocks.

15. The computer program product of claim 14, wherein the order of the one or more extended region control blocks is a numerical order based on region number.

16. The computer program product of claim 11, wherein the tree data structure is a 4-ary tree data structure.

17. The computer program product of claim 11, wherein the third instructions for managing the base region control block and one or more extended region control blocks include instructions for providing a lookup function for looking up a specific region control block in the tree data structure.

18. The computer program product of claim 11, wherein the third instructions for managing the base region control block and one or more extended region control blocks include instructions for providing an insert function for inserting a new extended region control block node in the tree data structure.

19. The computer program product of claim 18, wherein the insert function is an atomic operation.

20. The computer program product of claim 11, wherein the third instructions for managing the base region control block and one or more extended region control blocks include instructions for providing a successor function for identifying an extended region control block that immediately succeeds a given extended region control block.

21. An apparatus for managing region control blocks of a data file, comprising:

means for generating a base region control block for a base region of the data file;

means for generating one or more extended region control block nodes arranged in a tree data structure for one or more extended regions of the data file, a first one of the one or more extended region control block nodes being a root of the tree data structure, the one or more extended region control block nodes including one or more child node pointers that point to child extended region control block nodes and including a pointer to the base region control block;

the base region control block including a pointer that points to the root, wherein the base region control block is not the root of the tree; and means for managing the base region control block and one or more extended region control blocks based on the tree data structure.

* * * * *